United States Patent
Li et al.

(10) Patent No.: US 9,894,076 B2
(45) Date of Patent: Feb. 13, 2018

(54) DATA PROTECTION AND SHARING

(71) Applicant: International Business Machines Corporation, Armonk, NY (US)

(72) Inventors: Chen Li, Beijing (CN); Xiran Li, Beijing (CN); Graham A. Watts, Ottawa (CA); Wei Wu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 14/879,121

(22) Filed: Oct. 9, 2015

(65) Prior Publication Data
US 2017/0104759 A1  Apr. 13, 2017

(51) Int. Cl.
*H04L 29/06* (2006.01)
*G06F 21/62* (2013.01)

(52) U.S. Cl.
CPC ........ *H04L 63/102* (2013.01); *G06F 21/6245* (2013.01)

(58) Field of Classification Search
CPC ............................. H04L 63/102; G06F 21/6245
See application file for complete search history.

(56) References Cited

U.S. PATENT DOCUMENTS

| | | | |
|---|---|---|---|
| 7,716,140 B1 * | 5/2010 | Nielsen | G06F 21/6245 705/319 |
| 9,020,965 B1 | 4/2015 | Sehrer | |
| 2006/0248584 A1 * | 11/2006 | Kelly | G06F 21/6245 726/18 |
| 2008/0104679 A1 * | 5/2008 | Craig | H04L 67/306 726/4 |
| 2009/0070334 A1 * | 3/2009 | Callahan | G06F 21/604 |
| 2009/0248602 A1 * | 10/2009 | Frazier | G06F 17/30035 706/46 |
| 2010/0280965 A1 * | 11/2010 | Vesterinen | G06F 21/6245 705/319 |
| 2011/0029566 A1 * | 2/2011 | Grandison | G06Q 50/01 707/783 |
| 2014/0026184 A1 | 1/2014 | Pergament et al. | |

(Continued)

FOREIGN PATENT DOCUMENTS

WO    2011048619 A1    4/2011

OTHER PUBLICATIONS

Yan et al., A Scheme to Secure Instant Community Data Access Based on Trust and Contexts, Dec. 2014, IEEE International Conference on Computer and Information Technology, pp. 646-651.*

(Continued)

*Primary Examiner* — Kenneth Chang
(74) *Attorney, Agent, or Firm* — Maeve Carpenter; Alexander G. Jochym (57) ABSTRACT

In an approach to data protection and sharing, a computer retrieves social network data of a first user, and obtains a relationship grade between the first user and a second user, and a level associated with the personal data of the first user. Then it is determined whether the second user qualifies to access the personal data of the first user, based, at least in part, on the relationship grade and the level associated with the personal data. If it is determined that the second user qualifies to access the personal data of the first user, the second user is permitted to access the personal data.

15 Claims, 3 Drawing Sheets

(56) References Cited

U.S. PATENT DOCUMENTS

2014/0032259 A1 1/2014 LaFever et al.
2014/0379796 A1 12/2014 Altaf et al.

OTHER PUBLICATIONS

Allen et al., "Deep Semantic Analysis of Text", pp. 343-354, printed on Sep. 24, 2015, <http://www.aclweb.org/anthology/W08-2227.pdf>.

Cutillo et al., "Safebook: A Distributed Privacy Preserving Online Social Network", IEEE, © 2011, printed on Sep. 16, 2015, 3 pages.

Dhami et al., "Impact of trust, security and privacy concerns in social networking: An exploratory study to understand the pattern of information revelation in Facebook", 2013 3rd IEEE International Advance Computing Conference (IACC), © 2012, printed on Sep. 16, 2015, IEEE, pp. 465-469.

"SaND", IBM, printed on Sep. 16, 2015, 1 page, <https://www.research.ibm.com/haifa/projects/imt/social/sand.shtml>.

* cited by examiner

DATA PROTECTION AND SHARING

BACKGROUND

The present invention relates to data processing, and more specifically, to data protection and sharing.

Nowadays, more and more personal data is generated, accessed, and stored on social networks, such as phone numbers, personal interests, contacts and social activity information, etc. In one's daily life and work, a user may want to share certain, often limited, personal data with another user early on in a relationship. As they become more and more familiar with each other, the user may wish to share more personal data with the another user.

SUMMARY

According to one embodiment of the present invention, there is provided a computer-implemented method for data protection and sharing. The method includes a computer retrieving social network data of a first user, and obtaining a relationship grade between the first user and a second user and a level associated with the personal data of the first user. The computer then determines whether the second user qualifies to access the personal data of the first user, at least based on the relationship grade and the level associated with the personal data. If it is determined that the second user qualifies to access the personal data of the first user, the second user is permitted to access the personal data.

According to another embodiment of the present invention, there is provided a computer system comprising one or more computer processors, one or more computer readable storage devices, and program instructions stored on the one or more computer readable storage devices for execution by the one or more computer processors, for data protection and sharing. The computer program instructions include program instructions to retrieve social network data of a first user, obtain a relationship grade between the first user and a second user, and obtain a level associated with the personal data of the first user. The program instructions then determine whether the second user qualifies to access the personal data of the first user, based, at least in part, on the relationship grade and the level associated with the personal data; and, in response to determining that the second user qualifies to access the personal data of the first user, permit the second user to access the personal data.

According to still another embodiment of the present invention, there is provided a computer program product for data protection and sharing. The computer program product comprises one or more computer readable storage devices, having program instructions embodied therewith. The program instructions are executable by a processor to cause the processor to retrieve social network data of a first user, obtain a relationship grade between the first user and a second user, and obtain a level associated with the personal data of the first user. The program instructions then determine whether the second user qualifies to access the personal data of the first user, based, at least in part, on the relationship grade and the level associated with the personal data; and, in response to determining that the second user qualifies to access the personal data of the first user, permit the second user to access the personal data.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
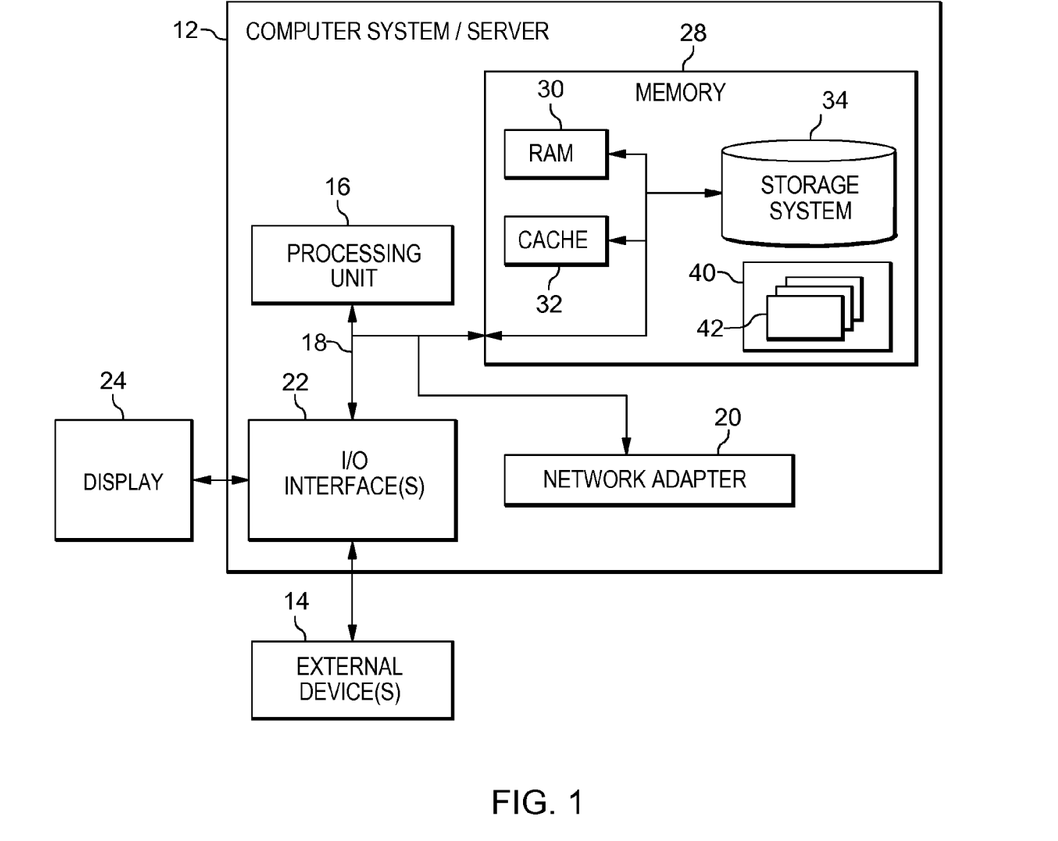
FIG. 1 shows an exemplary computer system which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing unit(s) 16, a system memory 28, and a bus 18 that couples various system components including system memory 28 to processing unit(s) 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Embodiments of the present invention provide a mechanism for data protection and sharing. Embodiments of the present invention determine based on the content of information being exchanged between users, both the relationship of the connected users, and the sensitivity of the information being exchanged. In embodiments, the social relationship between users can be analyzed and graded automatically, and personal data stored on the social network can be graded automatically for sharing and protection purpose. The graded social relationship and graded personal data can be used in determining what personal data can be shared and/or whether some shared personal data need to be revoked, in a dynamic and automatic manner. In such a way, manual operations by users can be avoided or reduced.

Figure 2:
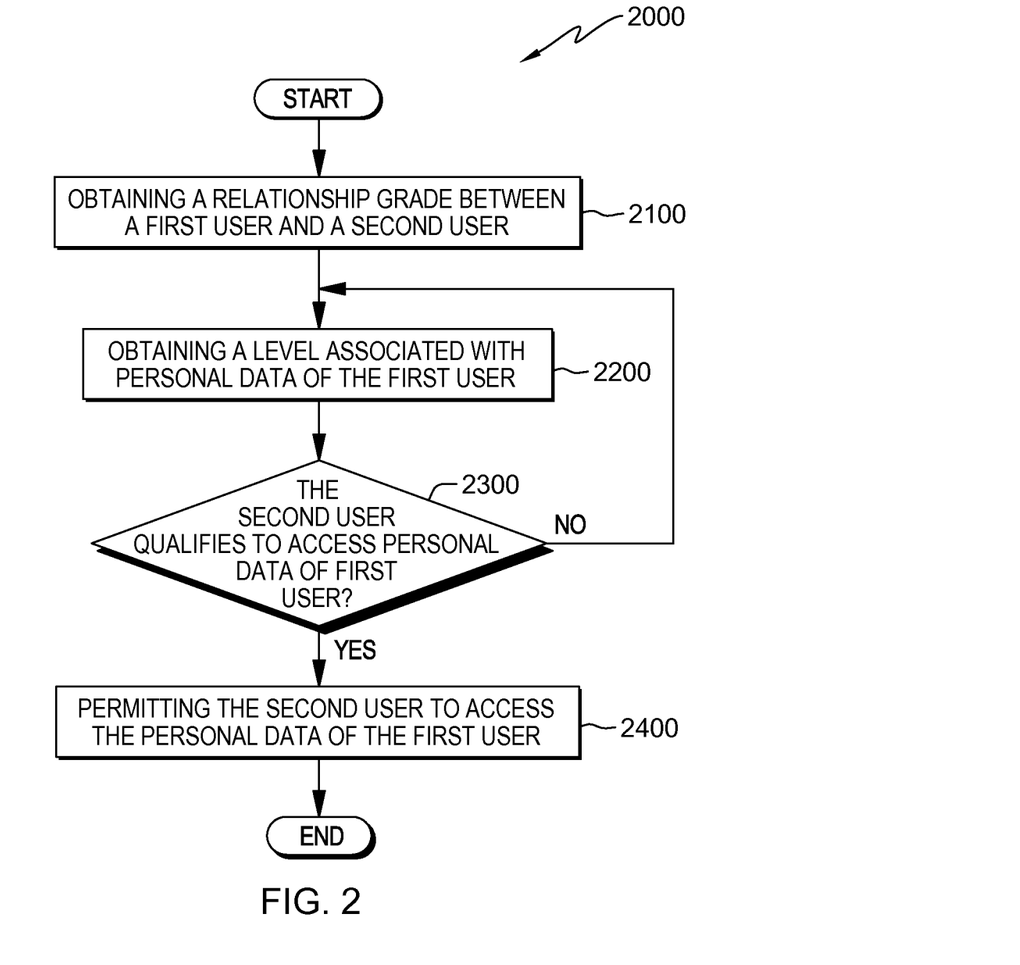
FIG. 2 shows a flow chart of the method according to an embodiment of the present invention.

Reference is made now to FIG. 2, which shows a flow chart of the method 2000 according to an embodiment of the present invention.

At step 2100, the method of the invention obtains a relationship grade between a first user and a second user of a social network application. The relationship grade is determined based on social network data of the first user, which is retrieved from a social network application, or from a repository or database, such as social network data 310 in FIG. 3. The social network data may include personal metadata of the first user, social activity data, such as the first user commenting on other users shared information, or the first user sharing information with the social network application.

At step 2200, the method of the invention obtains a level associated with the personal data of the first user. In various embodiments, personal data may include identifying information of a user, and/or social network activities of a user. In embodiments of the present invention, one or more levels of personal data are pre-determined, as discussed with reference to personal data grading service 340 in FIG. 3. At decision step 2300, the method of the invention determines whether the second user qualifies to access the personal data of the first user, based, at least in part, on the relationship grade and the level associated with the personal data. If it is determined the second user qualifies to access the personal data of the first user (decision step 2300, "yes" branch), then, at step 2400, the method of the invention permits the second user to access the personal data of the first user. For example, a flag may be set to indicate that the second user is permitted to access the personal data of the first user. If it is determined the second user does not qualify to access the personal data of the first user (decision step 2300, "no" branch), the method of the invention returns to step 2200 to process with a next piece of personal data.

Figure 3:
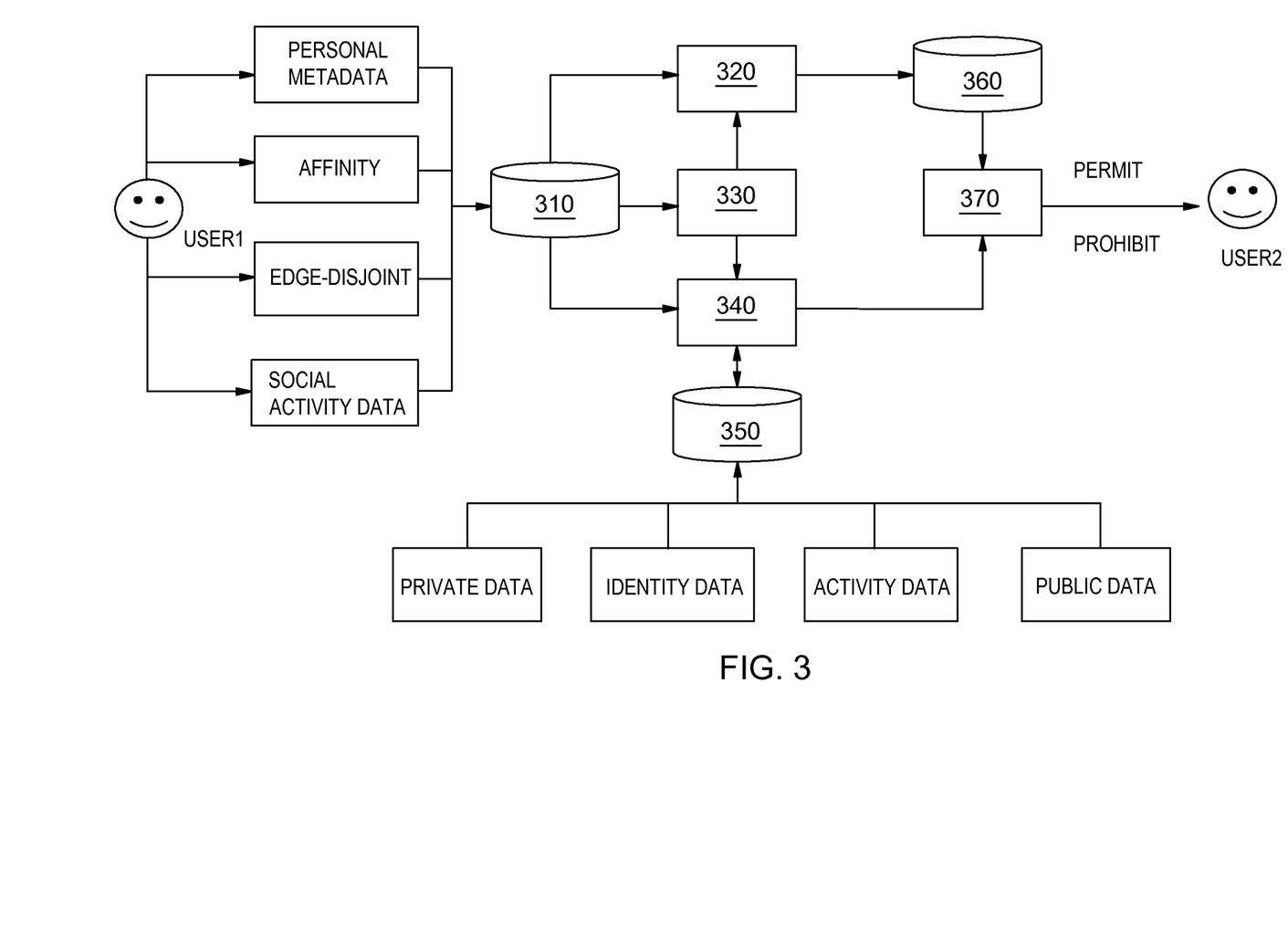
FIG. 3 shows an exemplary architecture and work flow for performing the method according to an embodiment of the present invention.

FIG. 3 shows an exemplary architecture and work flow for performing the method according to an embodiment of the present invention.

As shown in FIG. 3, social network data 310 of a user 1 may be stored in, for example, a database or a repository. The social network data may include various kinds of raw data and can be collected from activities of the user 1 and others on the social network. For example, the social network data may comprise personal metadata of the user 1 such as name, phone numbers, and bank account of the user 1, affinity and edge-disjoint data describing relationship between user 1 and other users of the social network application, such as friendship with other users, and social activity information such as a blog posted by the user 1. The social network data 310 may be dynamically updated from time to time.

The social network data 310 may be analyzed and categorized by using, for example, an activity and semantic analysis service 330. By using activity and semantic analysis service 330, useful information including personal data and relationship data may be analyzed or extracted automatically. For example, in response to an event that the user 1 posted a blog describing a dinner with a friend in a restaurant, the activity and semantic analysis service 330 may be activated to analyze and extract social network data of the user 1. The following information may be obtained from the blog and the action of posting the blog:

1. The user 1 posted a blog with 800 words at 8:05 pm on Monday;
2. The user 1 had a dinner in Restaurant A on Monday;
3. The user 1 had a dinner with a user 2 on Monday;
4. The user 1 likes/dislikes Restaurant A;
5. The user 1 likes/dislikes Food B in Restaurant A, etc.

The above information can be considered as social network data of the user 1. The activity and semantic analysis service 330 can be implemented by various ways which are known in the art.

One example of the activity and semantic analysis service 330 can be the Cognos® SMA that performs semantic analysis on tweets and other social media to look for positive or negative statements around products, for example. The activity and semantic analysis service 330 may simply look for the presence of some specific keywords or pairs of keywords in the text.

For example, keywords such as "income" and "salary" or even a pattern indicating a monetary amount could be recognized by the activity and semantic analysis service 330 in analyzing the salary of a user. Also, more complex linguistic techniques can be used, such as frame based analysis to determine the meaning of the sentences themselves, or a graphical logical form as a semantic representation for text understanding.

On one hand, as discussed with reference to step 2200 above, the personal data from the activity and semantic analysis service 330 and the social network data 310 will be graded into several pre-defined levels using a personal data grading service 340, for example. In an embodiment of the invention, a level of the personal data may indicate a degree of confidentiality of the personal data. For example, the personal data may be graded into four levels, i.e., private data, identity data, activity data and public data. The private data may comprise age, salary, finance account, etc. The identity data may comprise, for example, name, phone numbers, address, etc. The activity data may include posted blogs, having a dinner at a certain restaurant yesterday, etc. And the public data may comprise, e.g., nickname, gender, and IP address. Other levels may also be pre-defined. In various embodiments, the specific levels and conditions for grading may be set by users. The personal data grading service 340 can be provided by, for example, an Intelligent Data Classifier System which is known in the art. Additionally, several arithmetic operations for grading data, such as Artificial Neural Network, Beyes and VSM, are known in the art. The graded personal data 350 may be stored in a data repository.

On the other hand, as discussed with reference to step 2100 above, the relationship data from the activity and semantic analysis service 330 and the social network data 310 can be used to determine a relationship grade 360 between the user 1 and the user 2, using the relationship grading service 320. The relationship grade 360 indicates a familiarity degree between the user 1 and the user 2, and may be adjusted by the user 1 manually. The relationship grade 360 may also be obtained from a third party service provider, such as a social media application or social network application. The relationship grading service 320 can be implemented by several methods known in the art.

Then, it can be determined, as discussed with reference to decision step 2300 above, using a data protection and sharing service 370, whether the user 2 qualifies to access the personal data of the user 1, based on the relationship grade 360 between the user 1 and the user 2 and the level of personal data of the user 1. If the relationship grade 360 matches a specific level of personal data of the user 1, e.g., the relationship grade 360 indicates that the user 1 and the user 2 are familiar enough or have a relationship grade high enough to allow the user 2 to get the specific level of personal data of the user 1, then the user 2 qualifies to access the personal data of the specific level of the user 1. After that, the user 2 is permitted to access the specific level of personal data, as discussed above with reference to step 2400.

For example, the relationship grade between a customer and a delivery person may only match the level of identity data of the customer including name, phone number and address, and is not high enough to match the level of private data of the customer, such as age and salary. In this scenario, the delivery person is permitted to access the identity data but not permitted to access the private data of the customer.

Preferably, a permission issued to the user 2 in accessing personal data of the user 1 expires after a certain period of time automatically. In another embodiment, the permission will be revoked if it is determined that user 2 no longer qualifies to access the personal data of the user 1. In this case, the user 2 will be prohibited from accessing the personal data of the user 1 again.

Preferably, determining whether the user 2 qualifies to access the personal data of user 1 may be performed periodically, such as everyday or every other day. Alternatively, it may be triggered by an activity of the user 1 or the user 2, for example, receiving a request for address of the user 1 from the user 2, or submitting an order to the user 2 by the user 1.

The following example will be described to illustrate the invention. Jack and Rose are both users in a social network but do not know each other initially. At this initial time, their personal data on the social network is not shared with each other since the relationship grade between them will be low.

Eventually, Jack and Rose get to know each other in the social network because of a same interest, and start to have additional social activities in common, such as a shared group or commenting on the other's updates on the social network. Therefore, their relationship grade is determined as "friend" by the relationship grading service 320. Upon the change of the relationship grade, Jack is permitted to access level 1 personal data of Rose, such as Rose's phone number and email address.

After several more months, Jack and Rose become close friends with each other and their interactions are much more frequent on the social network. Some key words are captured from their activities by the activity and semantic analysis service 330. Their relationship becomes more intimate, as determined based on social activities and thus the relationship grade promotes to "close friends". Correspondingly, Jack is permitted to access more personal data of Rose, such as age, favorite food, friends, etc.

In an embodiment, their relationship can be re-estimated if they did not make interactions on the social network for a specific period of time. Information concerning their relationship changes will be captured by the activity and semantic analysis service 330. Upon this situation, their relationship grade is re-estimated and turned back from "close friends" to "friends" again by the relationship grading service 320. They cannot access some private data of each other based on their new relationship.

Another example in e-commerce will be described now. A customer places an order at an e-commerce website. This event triggers the mechanism according to the present invention. The transaction data is then analyzed by the activity and semantic analysis service 330. As a result, the relationship between the customer and the e-commerce website concerning this transaction is provided to the relationship grading service 320.

The relationship grading service 320 computes the relationship grade between the customer and the e-commerce website based on the relationship data provided by the activity and semantic analysis service 330, and outputs the result of the relationship grade to the data protection and sharing service 370. The data protection and sharing service 370 analyzes the relationship grade and decides to permit the e-commerce website to access the customer's address and mobile phone number.

Then, the data protection and sharing service 370 may request the customer's address and mobile phone number from the personal data grading service 340. The personal data grading service 340, in response to the request by the data protection and sharing service 370, transmits the requested data to the data protection and sharing service 370.

The data protection and sharing service 370 shares the customer's address and mobile phone number to the e-commerce website after receiving them from the personal data grading service 340. When the transaction completes, the right of the e-commerce website for accessing the customer's address and mobile phone number of the customer may be automatically revoked by the data protection and sharing service 370.

From above it can be seen that the system according to the present invention has at least one of the following advantages. Particularly, the social relationship can be analyzed and graded by social activities automatically. Personal data can be also graded automatically for sharing and protection purpose. Furthermore, the protection and sharing of personal data can be adapted to the social activities changed dynamically.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improving social network content exchange utilizing automated data protection and dynamic sharing of personal data, the method comprising:
    retrieving, by one or more computer processors, social network data of a first user;
    determining, by one or more computer processors, a relationship grade between the first user and a second user, based, at least in part, on the social network data, wherein the relationship grade indicates a familiarity degree between the first user and the second user;
    determining, by one or more computer processors, a level associated with personal data of the first user, wherein the level associated with the personal data indicates a degree of confidentiality the personal data, the degree of confidentiality and includes a private level, an identity level, an activity level and a public level;
    determining, by one or more computer processors, whether the second user qualifies to access the personal data of the first user, based, at least in part, on the relationship grade and the level associated with the personal data, wherein the determination is automatically performed periodically over a pre-determined period of time to capture a change in the relationship grade between the first user and the second user, and the level associated with personal data shared by the first user; and
    responsive to determining that the second user qualifies to access the personal data of the first user, permitting, by one or more computer processors, the second user to access the personal data of the first user, wherein a permission to access the personal data expires automatically after a pre-determined period of time.

2. The computer-implemented method according to claim 1, further comprising:
    determining, by one or more computer processors, whether the relationship grade indicates a familiarity degree between the first use and the second user that qualifies the second user for the level associated with the personal data; and
    responsive to determining the relationship grade indicates a familiarity degree between the first use and the second user that qualifies the second user for the level associated with the personal data, determining, by one or more computer processors, that the second user is permitted to access the personal data of the first user.

3. The computer-implemented method according to claim 1, further comprising:
    prohibiting, by one or more computer processors, the second user from accessing the personal data in response to determining that the second user does not qualify to access the personal data of the first user.

4. The computer-implemented method according to claim 1, wherein the relationship grade is determined from relationship data, the relationship data and the personal data being analyzed or extracted from the social network data of the first user.

5. The computer-implemented method according to claim 1, wherein the social network data includes social network activities of the first user.

6. A computer system for improving social network content exchange utilizing automated data protection and dynamic sharing of personal data, the computer system comprising:
    one or more computer processors;
    one or more computer readable storage devices; and
    program instructions stored on the one or more computer readable storage devices for execution by at least one of the one or more computer processors, the stored program instructions comprising:
    program instructions to retrieve social network data of a first user;
    program instructions to determine a relationship grade between the first user and a second user, based, at least in part, on the social network data, wherein the relationship grade indicates a familiarity degree between the first user and the second user;
    program instructions to determine a level associated with personal data of the first user, wherein the level associated with the personal data indicates a degree of confidentiality the personal data, the degree of confidentiality and includes a private level, an identity level, an activity level and a public level;
    program instructions to determine whether the second user qualifies to access the personal data of the first user, based, at least in part, on the relationship grade and the level associated with the personal data, wherein the determination is automatically performed periodically over a pre-determined period of time to capture a change in the relationship grade between the first user and the second user, and the level associated with personal data shared by the first user; and
    responsive to determining that the second user qualifies to access the personal data of the first user, program instructions to permit the second user to access the personal data of the first user, wherein a permission to access the personal data expires automatically after a pre-determined period of time.

7. The computer system according to claim 6, further comprising:
    program instructions to determine whether the relationship grade indicates a familiarity degree between the first use and the second user that qualifies the second user for the level associated with the personal data; and
    responsive to determining the relationship grade indicates a familiarity degree between the first use and the second user that qualifies the second user for the level associated with the personal data, determining, by one or more computer processors, that the second user is permitted to access the personal data of the first user.

8. The computer system according to claim 6, further comprising:
    program instructions to prohibit the second user from accessing the personal data in response to determining that the second user does not qualify to access the personal data of the first user.

9. The computer system according to claim 6, wherein the relationship grade is determined from relationship data, the relationship data and the personal data being analyzed or extracted from the social network data of the first user.

10. The computer system according to claim 6, wherein the social network data includes social network activities of the first user.

11. A computer program product for improving social network content exchange utilizing automated data protection and dynamic sharing of personal data, the computer program product comprising:

one or more computer readable storage devices and program instructions stored on the one or more computer readable storage devices, the stored program instructions comprising:

program instructions to retrieve social network data of a first user;

program instructions to determine a relationship grade between the first user and a second user, based, at least in part, on the social network data, wherein the relationship grade indicates a familiarity degree between the first user and the second user;

program instructions to determine a level associated with personal data of the first user, wherein the level associated with the personal data indicates a degree of confidentiality the personal data, the degree of confidentiality and includes a private level, an identity level, an activity level and a public level;

program instructions to determine whether the second user qualifies to access the personal data of the first user, based, at least in part, on the relationship grade and the level associated with the personal data, wherein the determination is automatically performed periodically over a pre-determined period of time to capture a change in the relationship grade between the first user and the second user, and the level associated with personal data shared by the first user; and responsive to determining that the second user qualifies to access the personal data of the first user, program instructions to permit the second user to access the personal data of the first user, wherein a permission to access the personal data expires automatically after a pre-determined period of time.

12. The computer program product according to claim 11, further comprising:

program instructions to determine whether the relationship grade indicates a familiarity degree between the first use and the second user that qualifies the second user for the level associated with the personal data; and responsive to determining the relationship grade indicates a familiarity degree between the first use and the second user that qualifies the second user for the level associated with the personal data, determining, by one or more computer processors, that the second user is permitted to access the personal data of the first user.

13. The computer program product according to claim 11, further comprising:

program instructions to prohibit the second user from accessing the personal data in response to determining that the second user does not qualify to access the personal data of the first user.

14. The computer program product according to claim 11, wherein the relationship grade is determined from relationship data, the relationship data and the personal data being analyzed or extracted from the social network data of the first user.

15. The computer program product according to claim 11, wherein the social network data includes social network activities of the first user.

\* \* \* \* \*